United States Patent [19]

Olsen et al.

[11] 4,383,101
[45] May 10, 1983

[54] LINEAR HYDROQUINONE PHENOXY POLYMERS AND PROCESS

[75] Inventors: Eric G. Olsen; Winston J. Jackson, Jr., both of Kingsport, Tenn.

[73] Assignee: Eastman Kodak Company, Rochester, N.Y.

[21] Appl. No.: 237,174

[22] Filed: Feb. 23, 1981

Related U.S. Application Data

[63] Continuation-in-part of Ser. No. 108,722, Dec. 31, 1979, Pat. No. 4,267,301.

[51] Int. Cl.$^3$ ............................................. C08G 59/06
[52] U.S. Cl. ..................................... 528/93; 428/413; 528/87; 528/95; 528/104
[58] Field of Search ................... 528/87, 93, 95, 104

[56] References Cited

U.S. PATENT DOCUMENTS

| | | | |
|---|---|---|---|
| 2,602,075 | 7/1952 | Carpenter et al. | 528/93 |
| 3,238,087 | 3/1966 | Norwalk et al. | 161/185 |
| 3,395,118 | 7/1968 | Reinking et al. | 528/93 |
| 3,701,680 | 10/1972 | Lee et al. | 117/138.8 F |
| 3,767,618 | 10/1973 | Harriston et al. | 528/95 |
| 4,267,301 | 5/1981 | Olsen et al. | 528/87 |

*Primary Examiner*—Lester L. Lee
*Attorney, Agent, or Firm*—William P. Heath, Jr.; Daniel B. Reece, III

[57] ABSTRACT

This invention relates to a process for the preparation of thermoplastic polymers. Specifically it relates to a process for the preparation of a substantially linear, high molecular weight phenoxy resin from substituted hydroquinone, less than 80 mole percent of hydroquinone and optionally up to about 20 mole percent of a second aromatic diol, epichlorohydrin (or another epihalohydrin) and a base, such as sodium hydroxide.

Hydroquinone phenoxy resins of this invention are characterized by low permeability to oxygen and carbon dioxide and are, therefore, useful as a gas-barrier layer in multilayer plastic film constructions used in food packaging and beverage bottle applications, for example. For use in such applications, the resin is generally in the form of a thin, uniform film prepared by extrusion, casting, or other such method. It is highly desirable that polymers used in this manner be as free as possible from chain branches or cross-links, as these lead to the formation of gel particles which cause imperfections in the polymer film. These imperfections, in turn, detract from the appearance of the film. Moreover, as is well known, increasing the amount of chain branching in a polymer results in an undesirable reduction of flexibility and toughness.

27 Claims, No Drawings

LINEAR HYDROQUINONE PHENOXY POLYMERS AND PROCESS

This application is a continuation-in-part of our application Ser. No. 108,722 filed Dec. 31, 1979 now U.S. Pat. No. 4,267,301.

DESCRIPTION

1. Technical Field

This invention relates to new high molecular weight, essentially linear hydroquinone phenoxy polymers. It is particularly concerned with polymers made from substituted hydroquinone, which may be replaced with up to less than 80 mole percent of another aromatic diol such as hydroquinone and an epihalohydrin. The polymers are characterized by low permeability to oxygen and carbon dioxide and are particularly useful as a gas-barrier layer in multilayer plastic film and in beverage bottles.

This invention also relates to a new process for producing the novel hydroquinone polymers, the process involving reacting substituted hydroquinone, which may be replaced with up to less than 80 mole percent of hydroquinone with about 0.95 to 1.05 equivalents of an epihalohydrin in the presence of about 1.0 to 1.1 equivalents of a base and about 1 to 7 parts by weight of a solvent for the polymer per part polymer. It is preferred that water be present in the amount of from about 0.8 to 10 parts by weight polymer and that a phase transfer catalyst be used.

The new process results in polymer that is essentially free from chain branches or cross-links which lead to gel particles in the polymer. The polymer produced by our process is particularly useful for forming films which exhibit unusual gas barrier properties and thus are particularly suitable in food-package and beverage bottle applications.

2. Background Art

Two processes for the preparation of hydroquinone phenoxy resin have been disclosed by A. S. Carpenter, E. R. Wallsgrove and F. Reeder (British Pat. No. 652,024). In the first process, hydroquinone bis(glycidyl ether) is allowed to react with hydroquinone under the influence of a suitable catalyst. We have found that this process gives material which is highly branched, and in some cases a cross-linked, infusible resin is obtained.

According to the second procedure of Carpenter et al., hydroquinone phenoxy resin is formed directly from hydroquinone, epichlorohydrin, and base (e.g., sodium hydroxide) in an ethanol-water reaction medium. Low molecular weight polymer precipitates early in the reaction, and its molecular weight increases slowly thereafter in a heterogeneous reaction. We have found that this reaction gives erratic results because of solvent-induced crystallization of the polymer phase. In some cases, gelled material is produced, while in other cases only low molecular weight polymer is obtained.

On the other hand, an analogous phenoxy resin, prepared from bisphenol A (4,4′-isopropylidenediphenol), may be prepared by several methods similar to the above, but which fail when applied to hydroquinone phenoxy resin.

These methods fail with hydroquinone phenoxy resin because, being heterogeneous reactions, they depend upon facile transfer of monomer molecules from the solution phase to the semi-solid polymer phase. Hydroquinone phenoxy resin, however, becomes crystalline under the influence of the water or water/alcohol reaction medium and is no longer penetrable by monomer molecules. This results in low average molecular weight, broad molecular weight distribution, and in irreproducible results. The reaction conditions are suitable for bisphenol A phenoxy resin, on the other hand, because this latter resin is not crystallizable under the reaction conditions and remains permeable to monomer molecules.

Bisphenol A phenoxy resin may be prepared directly from bisphenol A, base, and epichlorohydrin in an alcohol-water reaction mixture (U.S. Pat. No. 3,305,528) in a process very similar to the hydroquinone phenoxy resin process disclosed in British Pat. No. 652,024 above. It may also be prepared in an "interfacial" process in which one phase of the reaction medium is aqueous base (e.g., NaOH) and the other phase is the polymer itself (U.S. Pat. No. 3,767,618). These methods work for bisphenol A phenoxy resin because it does not crystallize under the reaction conditions. Because hydroquinone phenoxy resin does crystallize, it cannot be prepared by these methods.

U.S. Pat. No. 3,238,087 discloses laminated structures in which one component is a hydroquinone phenoxy resin. However, no process is given or suggested which will produce the particular hydroquinone phenoxy polymer disclosed in this specification.

We are not aware of a patent covering the use of a two-phase solvent system in which the polymer is soluble in one component. Indeed, U.S. Pat. No. 3,767,618 teaches that such a system leads to inferior results with the bisphenol A resin (cf. their example 4).

DISCLOSURE OF THE INVENTION

This invention relates to a process for the preparation of thermoplastic polymers. Specifically, it relates to a process for the preparation of a substantially linear, high molecular weight phenoxy resin from hydroquinone substituted, optionally less than 80 mole percent of hydroquinone epichlorohydrin (or another epihalohydrin) and a base, such as sodium hydroxide, and the polymer produced thereby.

In our U.S. application Ser. No. 108,722 filed Dec. 31, 1979, now U.S. Pat. No. 4,267,301, we disclosed hydroquinone phenoxy resins or polymers in which the aromatic diol component was at least 80 mole percent of hydroquinone with the remainder being another aromatic diol. We have found that certain aromatic diols substituted with one or two substituents which may be chlorine or an alkyl group containing 1–4 carbon atoms used as greater than 20 mole percent of the aromatic diol component of the polymer result in improved properties over those of the hydroquinone phenoxy resins disclosed and claimed in our earlier application. In particular the use of substituted hydroquinone derivatives such as chloro or dichlorohydroquinone give improved gas barrier properties and methyl hydroquinone may be used to provide a polymer with modified crystalline properties or solubility.

The process provides sufficiently mild polymerization conditions to reduce the degradation of base-sensitive aromatic diols substituted with one or two substituents which may be chlorine or an alkyl group containing 1–4 carbon atoms while at the same time remaining sufficiently vigorous to overcome the steric hindrance to polymerization presented by even relatively bulky substituents, such as methyl or tert-butyl groups. The process is applicable to mixtures of substituted and unsubstiuted hydroquinones in any proportion.

The hydroquinone phenoxy resins or polymers of this invention are characterized by low permeability to oxygen and carbon dioxide and are, therefore, useful as a gas-barrier layer in multilayer plastic film constructions used in food packaging applications and beverage bottle applications, for example. For use in such applications, the resin is generally in the form of a thin, uniform film prepared by extrusion, casting, or other such method. It is highly desirable that polymers used in this manner be as free as possible from chain branches or crosslinks, as these lead to the formation of gel particles which cause imperfections in the polymer film. These imperfections, in turn, detract from the appearance of the film. Moreover, as is well known, increasing the amount of chain branching in a polymer results in an undesirable reduction of flexibility and toughness.

In the food packaging and beverage bottling industries, plastic film which can be shaped into containers by extrusion blow molding, forging, stretch blow molding or other processes is highly desirable. These plastic containers must not only be strong but must also have low permeability to gases, especially oxygen and/or carbon dioxide, in order to prevent spoilage of the contents of the package. In order to provide the optimum combination of properties in the most economical way, multiple-layer film structures may be produced by lamination, coextrusion, solution casting or other such methods in which the layers may consist of different polymers or polymer blends chosen to impart specific desirable properties to the overall layered film.

It is necessary that such a film have a low permeability to oxygen and/or carbon dioxide. It is also necessary that the layers of the film adhere to one another well, preferably when coextruded. The multilayer film and its individual components should also possess good thermal stability for ease of melt processing. And to enable the reuse of scrap laminated film by regrinding and blending of scrap with virgin material, it is desirable that all of the components of the multilayer film be compatible when re-extruded. Finally the multilayer film must be capable of being formed into suitable containers by processes such as stretch blow molding, forging, and so on, without loss of its desirable properties.

It is known that poly(ethylene terephthalate) modified with up to about 35 mole percent of other diacids or glycols is particularly well suited to film extrusion and subsequent thermoforming processes, although its permeability to oxygen and carbon dioxide is high. We have found that the substituted hydroquinone phenoxy resins of this invention may be combined with these polyesters in a multilayer film structure which, surprisingly, has excellent adhesion between layers when coextruded, has good compatibility when scrap is re-extruded, has low gas permeability and which may be thermoformed without loss of these desirable properties.

Multilayer constructions may be prepared by various techniques such as lamination, solvent casting or coextrusion, the latter being the preferred process from an economic and practical standpoint. In addition to flat sheet, the multilayer structure may be in the form of a tube or may be formed as part of an extrusion blow molding process.

The individual layers of the structure may be composed of pure components, e.g., polyester or substituted hydroquinone phenoxy resin, or of a blend of one or more polyesters and substituted hydroquinone phenoxy resin, such as may be produced by the blending of virgin polymer with reground scrap multilayer film prior to extrusion. In general it is preferred that the multilayer structure contain at least one layer of pure substituted hydroquinone phenoxy resin to obtain the optimum gas barrier property for the film structure; however, the desirable mechanical properties of the polyester are essentially unaffected by blending with substituted hydroquinone phenoxy resin.

We have found that high molecular weight, essentially linear substituted hydroquinone phenoxy resin may be prepared by the reaction of a greater than 20 mole percent hydroquinone substituted with one or two substituents from the group of chlorine or an alkyl group containing 1–4 carbon atoms, an epihalohydrin such as epichlorohydrin, and a base such as sodium hydroxide, in a reaction medium consisting of water and a polymer solvent, such as cyclohexanone. A phase-transfer catalyst such as benzyltriethylammonium chloride is used to enhance the transport of reagents across the aqueous/organic phase boundary and thereby accelerate the reaction rate.

In contrast to the previously-described methods, this phase-transfer solution polymerization is reproducible, suitable for scale-up, and gives a product whose ratio of weight-average molecular weight ($\overline{M}w$) to number-average molecular weight ($\overline{M}n$) is lower (for a given polymer inherent viscosity) than that obtained with other known methods, indicating a lower degree of chain branching.

It is surprising that high molecular weight substituted hydroquinone phenoxy resin can be made in the presence of an organic polymer solvent in view of the results obtained by T. J. Hairston and W. L. Bressler (U.S. Pat. No. 3,767,618) who demonstrated that for bisphenol A phenoxy resin, lower molecular weights are obtained when an organic solvent is added to the aqueous reaction mixture. Thus, substituted hydroquinone phenoxy resin behaves in a manner opposite to that of the closely analogous bisphenol A phenoxy resin.

Broadly the process of our invention for making our novel polymers comprises a process for the preparation of high molecular weight linear substituted hydroquinone phenoxy polymer from greater than 20 mole percent of a hydroquinone substituted with one or two substituents of the group chlorine and an alkyl group containing 1–4 carbon atoms, and an epihalohydrin, said process comprising reacting the hydroquinone compounds with about 0.95 to about 1.05 equivalents of an epihalohydrin in the presence of about 1.0 to 1.1 equivalents of a base and about 1 to 7 parts by weight solvent for said polymer per part polymer.

A preferred process of this invention involves reacting chlorohydroquinone with epichlorohydrin in the presence of sodium hydroxide, in a reaction medium consisting of water, cyclohexanone and benzyltriethylammonium chloride as the phase-transfer catalyst at a temperature of about 50° C. to about 100° C. for a time of about 2 to about 6 hours. At the end of this time, the polymer may be isolated by any one of several procedures well known to the art.

The novel linear substituted hydroquinone phenoxy polymer of this invention which may be prepared from greater than 20 mole percent hydroquinone substituted with one or two substituents of the group chlorine and an alkyl group containing 1–4 carbon atoms and an epihalohydrin is characterized by an inherent viscosity of about 0.45 to 0.9 as determined at 25° C. in a 60/40 by volume mixture of phenol/tetrachloroethene at a concentration of 0.5 gram/deciliter, a molecular weight distribution, as determined by gel permeation chromatography, of $\overline{M}w/\overline{M}n \leq$ about 4 and $\overline{M}z/\overline{M}n \leq 10$. The preferred inherent viscosity is about 0.5 to 0.7 and the preferred $\overline{M}w/\overline{M}n$ is $\leq 3$. Shaped objects such as films made from the polymer of our invention are particularly useful in a barrier layer in films and containers for food packaging applications.

The reactants include hydroquinone substituted with one or two substituents of the group chlorine and an alkyl group containing 1-4 carbon atoms, an epihalohydrin, and a base which is capable of effecting deprotonation of the aromatic diol and of catalyzing the polymerization. The substituted hydroquinone may be replaced with up to less than 80 mole percent of hydroquinone. Also the substituted hydroquinone may be replaced with up to about 20 mole percent of bisphenol A, tetrachlorobisphanol A, or phenolphthalein. Compounds in which the hydroxyl groups are located on adjacent carbon atoms of the same aromatic ring such as catechol, however, are not preferred because of the possibility of forming a closed-ring structure with one molecule of the epihalohydrin component.

Epihalohydrins which may be used include epichlorohydrin, epibromohydrin and epiiodohydrin, the preferred component being epichlorohydrin for economic reasons. In addition, 1,3-dihalohydrins, e.g., glycerol $\alpha,\gamma$-dichlorhydrin, may be used if an additional equivalent of base is used, per equivalent of dihalohydrin, in order to generate the epihalohydrin in situ.

The base used may be any base strong enough to deprotonate the aromatic diol to form its mono-anion. Examples of such bases are sodium hydroxide, potassium hydroxide, lithium hydroxide, tetraalkylammonium hydroxides, or the alkali metal salts of alcohols such as methanol, ethanol, or tert-butaneol. Sodium hydroxide is generally the preferred reagent because of its low cost.

The proportions of reactants used are about 0.95 mole to about 1.05 mole of epihalohydrin per equivalent of diol (or diol mixture) and about 1.0 to about 1.1 mole of base per mole of diol (or diol mixture). It is preferred to use about 0.98 mole of epihalohydrin per mole of diol in order to minimize chain branching; it is also preferred to use about 1.1 mole of base per mole of diol to provide a convenient reaction rate while limiting the extent of side reactions.

The solvent system consists of water and an organic solvent which is capable of dissolving the polymer and may or may not be immiscible with water. Such solvents include, but are not limited to, cyclohexanone, 2-butanone, acetophenone, dichloromethane, $\gamma$-butyrolactone, sulfoane, dimethyl sulfoxide, N-methyl-2-pyrrolidine, N,N-dimethyl formamide and triethyl phosphate. The choice of a solvent depends to some extent on the solubility characteristics of the polymer being prepared; for chlorohydroquinone phenoxy resin, the preferred solvent is cyclohexanone.

The proportion of water may range from about 0.8 part by weight water per part polymer to about 10 parts water per part polymer. The amount of organic solvent may vary from about 1 part to about 7 parts by weight solvent per part polymer. It is preferred to use the minimum amounts of water and organic solvents consistent with convenient handling in order to enhance the reaction rate. Moreover, it may be desirable to dilute the organic phase with additional organic solvent at the end of the reaction in order to facilitate the subsequent handling of the polymer solution.

The phase-transfer catalyst may be any one of several known to the art, including quaternary ammonium halides such as methyl tricaprylylammonium chloride, benzyltriethylammonium chloride, tetrabutylammonium bromide, etc., cyclic polyethers such as cyclic hexamer of ethylene glycol; or acyclic polyethers, such as poly(ethylene glycol). The amount of the catalyst may vary from about 0.01 to 0.10 mole catalyst per mole of diol. Higher amounts may be used, but are uneconomical. The preferred range is 0.02 to 0.05 mole catalyst per mole of diol; the preferred catalyst is benzyltrimethylammonium chloride or benzyltriethylammonium chloride.

The temperature of the reaction may be from about 50° C. to about 100° C., the preferred range being from about 80° C. to about 90° C. Time of reaction may be from about 2 to about 6 hours depending upon the temperature and degree of conversion required. A typical reaction time is 4 hours at 90° C.

At the end of the reaction, the reaction mixture is acidified by the addition of acetic acid, phosphoric acid, hydrochloric acid, etc., and the aqueous phase is drawn off. If desired, the polymer solution may be diluted, washed with water to remove residual sodium chloride, and the polymer may be recovered by removal of solvent by means of heat and/or vacuum. Alternatively, the polymer may be recovered by coagulation of the polymer solution with a polymer nonsolvent, a procedure which is well known.

This invention will be further illustrated by the following examples although it will be understood that these examples are included merely for purposes of illustration and are not intended to limit the scope of the invention.

Inherent viscosities (I.V.) were determined in a 60/40 (v./v.) mixture of phenol and tetrachloroethane at a concentration of 0.5 g./dl., at 25° C.

Determination of molecular weight distribution was performed by gel permeation chromatography (GPC) on a Waters Associates Model 200 GPC unit equipped with Styragel columns (Waters Associates), in m-cresol solvent, at a column temperature of 100° C. The columns were calibrated with polyethylene terephthalate (PET) standards, and the values of number-average, weight-average, and z-average molecular weights ($\overline{M}n$, $\overline{M}w$ and $\overline{M}z$) were calculated as PET-equivalent weights. An example of the calculation is given by N. C. Billingham in "Practical High Performance Liquid Chromatography," C. F. Simpson, ed., Heyden and Son Ltd., 1978, page 104, incorporated herein by reference.

EXAMPLE 1

A one-liter resin kettle is charged with 126.81 g. of chlorohydroquinone, 8.25 g of benzyltrimethylammonium chloride, 200 ml. cyclohexanone, and 230 ml. water. The kettle is purged with nitrogen and 82.31 g. of epichlorohydrin and 77.62 g. of 50% aqueous sodium hydroxide solution are added. The kettle is stirred at 80° C. for 5 hours and heated to reflux for 2.5 hours. The reaction mixture is acidified with 30 ml. acetic acid, the aqueous layer is drawn off, and the polymer solution is washed several times with hot water. Removal of solvent under vacuum yields 161 g. of polymer, PET-equivalent I.V.=0.62 (calculated from GPC data), $\overline{M}w/\overline{M}n$=2.4

EXAMPLE 2

A 500-ml. Morton flask is charged with 45.47 g. 2,5-dichlorohydroquinone, 2.38 g. benzyltrimethylammonium chloride, 40 ml. cyclohexanone, and 65 ml. water. The flask is thoroughly purged with nitrogen and 23.15 g. epichlorohydrin and 22.17 g. of a 50% aqueous solution of sodium hydroxide are added. The reaction mixture is stirred vigorously at 80° C. for 5 hours, and additional 20 ml. portions of cyclohexanone are added as necessary to maintain good stirring (total amount=100 ml.). The mixture is heated under gentle reflux for 2.5 hours, acidified with acetic acid, and the aqueous layer is drawn off. The polymer is precipitated by the addition of methanol. Yield 55 g. PET-equivalent I.V.=0.52 (calculated from GPC data), $\overline{M}w/\overline{M}n$=2.6

EXAMPLE 3

The procedure of Example 2 is followed, except that the dichlorohydroquinone is replaced with 31.22 g. methylhydroquinone. After heating at 80° C. for 4 hours, the reaction mixture is heated to reflux for 10 hours before acidification. The polymer is isolated by removal of solvent under vacuum to yield 39 g. polymer, I.V.=0.45, $\overline{M}w/\overline{M}n$=2.4.

EXAMPLE 4—Comparative

Following the method taught in U.S. Pat. No. 2,602,075, a 500 ml. flask is charged with 28.9 g. (0.20 mole) chlorohydroquinone and 64 ml. ethanol. The solution is thoroughly purged with nitrogen and a solution of 8.6 g. (0.21 mole) sodium hydroxide in 25 ml. water is added, followed by 30 ml. water and 44 ml. ethanol. The solution is heated to reflux and 18.5 g. (0.20 mole) epichlorohydrin are added slowly. A precipitate of low molecular weight polymer forms within 10 minutes and coagulates into a soft plastic mass within 3.5 hours. The ethanol/water reaction mixture is concentrated by distillation from the reaction, and in an effort to drive the reaction to completion, 100 ml. of dimethyl sulfoxide are added to dissolve the mass. The polymer solution is stirred at 100° C. for 1 to 2 hours without further increase in solution viscosity. Isolation of the product by precipitation in water gave a brownish polymer, I.V.=0.34 in phenol/tetrachloroethane solvent. Two repetitions of the above procedure gave polymers with I.V.'s of 0.33 and 0.36 respectively; the latter polymer also contained insoluble gels.

EXAMPLE 5—Comparative

Following the general method of U.S. Pat. No. 3,305,582, a 500 ml. baffled flask is charged with 22.8 g. (0.20 mole) hydroquinone, 7.5 g. (0.05 mole) chlorohydroquinone, 49 ml. isopropanol, 28 ml. water, and 23.5 ml. (0.25 mole) epichlorohydrin. After degassing 22.35 g. of a 50% aqueous solution of sodium hydroxide (0.28 mole) is added, followed by a solution of 3.67 g. benzyltriethylammonium chloride in 15 ml. of 55% aqueous isopropanol. The mixture is stirred for 16 hours at room temperature, during which time a fine voluminous precipitate forms. The mixture is heated to 80° C. for 3.5 hours with stirring, and two 15 ml. portions of cyclohexanone are added at intervals to maintain good stirring. After 3.5 hours, 2.3 g. phenol dissolved in 15 ml. cyclohexanone, followed by 30 ml. cyclohexanone, are added and the mixture is stirred a further 3.5 hours. The polymeric product obtained is gelled.

The invention has been described in detail with particular reference to preferred embodiments thereof, but it will be understood that variations and modifications can be effected within the spirit and scope of the invention.

We claim:

1. Process for the preparation of high molecular weight hydroquinone phenoxy polymer from at least 21 mole percent hydroquinone substituted with one or two substituents selected from chlorine or an alkyl group containing 1–4 carbon atoms and mixtures thereof, 0 to 79% mole percent hydroquinone and an epihalohydrin, said process comprising reacting the hydroquinone compounds with about 0.95 to about 1.05 equivalents of an epihalohydrin in the presence of about 1.0 to 1.1 equivalents of a base and of about one to seven parts by weight solvent for said polymer per part polymer.

2. Process of claim 1 wherein water is present in the amount of about 0.8 to 10 parts by weight water per part polymer.

3. Process of claim 2 wherein said solvent is immisible with water.

4. Process of claim 1 wherein said solvent is selected from cyclohexanone, 2-butanone, acetophenone, dichloromethane, γ-butyrolactone, sulfolane, dimethyl sulfoxide, N-methyl-2-pyrrolidone, N,N-dimethyl formamide and triethyl phosphate.

5. Process of claim 1 wherein said base is selected from sodium hydroxide, potassium hydroxide, lithium hydroxide, tetraalkylammonium hydroxides and alkali metal salts of alcohols.

6. Process of claim 1 wherein a phase transfer catalyst is present in the amount of up to about 10 mole percent of the hydroquinone compound.

7. Process of claim 6 wherein said catalyst is selected from quaternary ammonium halides, sulfates, acetates, cyclic polyethers and acyclic polyethers.

8. Process of claim 7 wherein said catalyst is present in the amount of 1 to 5 mole percent of the hydroquinone compound.

9. Process of claim 8 wherein said catalyst is selected from benzyltrimethylammonium chloride and benzyltriethylammonium chloride.

10. Process of claim 1 wherein the reaction temperature is from about 50° C. to 100° C.

11. Process of claim 1 wherein the reaction temperature is from about 80° C. to 90° C.

12. Process of claim 1 wherein said hydroquinone phenoxy polymer is modified with up to about 20 mole percent of another aromatic diol.

13. Process of claim 12 wherein said aromatic diol is resorcinol.

14. Process of claim 1 wherein said hydroquinone phenoxy polymer is modified with up to about 10 mole percent of another aromatic diol.

15. Process of claim 14 wherein said aromatic diol is resorcinol.

16. Linear hydroquinone phenoxy polymer prepared from at least 21% hydroquinone substituted with one or two substituents selected from chlorine or an alkyl group containing 1–4 carbon atoms, and mixtures thereof, 0 to 79% hydroquinone and an epihalohydrin, said polymer being characterized by an inherent viscosity of about 0.45 to 0.9 as determined at 25° C. in a 60/40 by volume mixture of phenol/tetrachloroethane solvent at a concentration of 0.5 gram/deciliter, a molecular weight distribution, as determined by gel permeation chromatography, of $\overline{M}w/\overline{M}n \leq$ about 4 and $\overline{M}z/\overline{M}n \leq$ about 10.

17. Linear hydroquinone phenoxy polymer of claim 16, wherein the inherent viscosity is about 0.5 to 0.7.

18. Linear hydroquinone phenoxy polymer of claim 16 wherein $\overline{M}w/\overline{M}n$ is $\leq$ about 3.

19. Linear hydroquinone phenoxy polymer of claim 16 modified with up to about 20 mole percent of an aromatic diol.

20. Linear hydroquinone phenoxy polymer of claim 19 wherein said aromatic diol is resorcinol.

21. Linear hydroquinone phenoxy polymer of claim 16 modified with up to about 10 mole percent of an aromatic diol.

22. Linear hydroquinone phenoxy polymer wherein said aromatic diol is resorcinol.

23. Shaped object of the polymer of claim 16.
24. Shaped object of the polymer of claim 19.
25. Shaped object of the polymer of claim 20.
26. Shaped object of the polymer of claim 21.
27. Shaped object of the polymer of claim 22.

* * * * *